Aug. 13, 1957 — E. J. FREY — 2,802,486
FLUID FLOW CONTROLLER
Filed Jan. 8, 1954 — 2 Sheets-Sheet 1
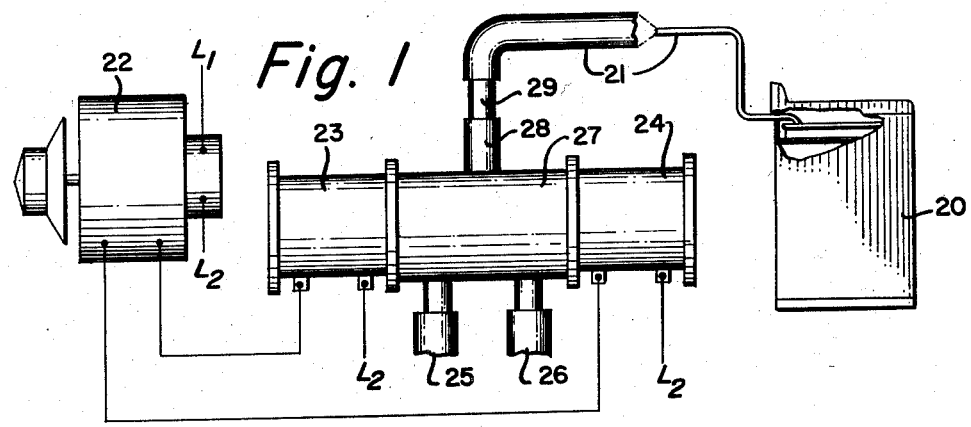
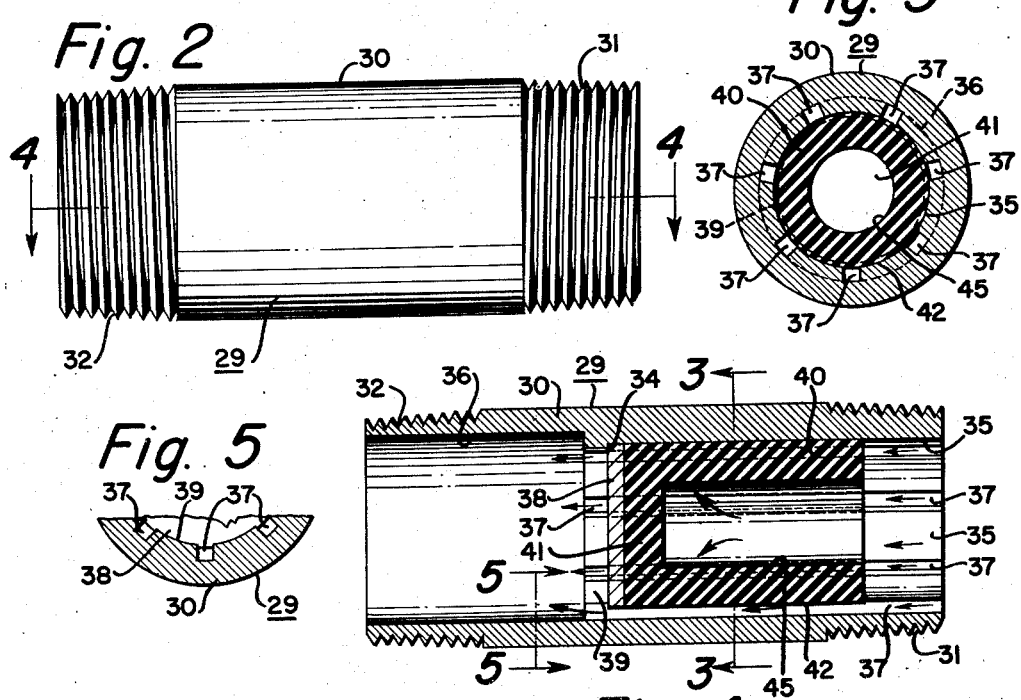
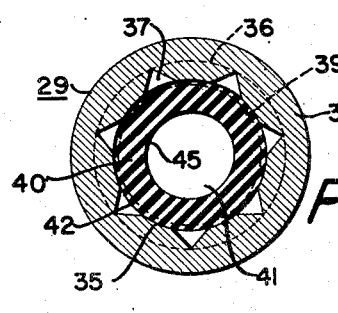
INVENTOR.
Edward J. Frey
BY
His Attorney

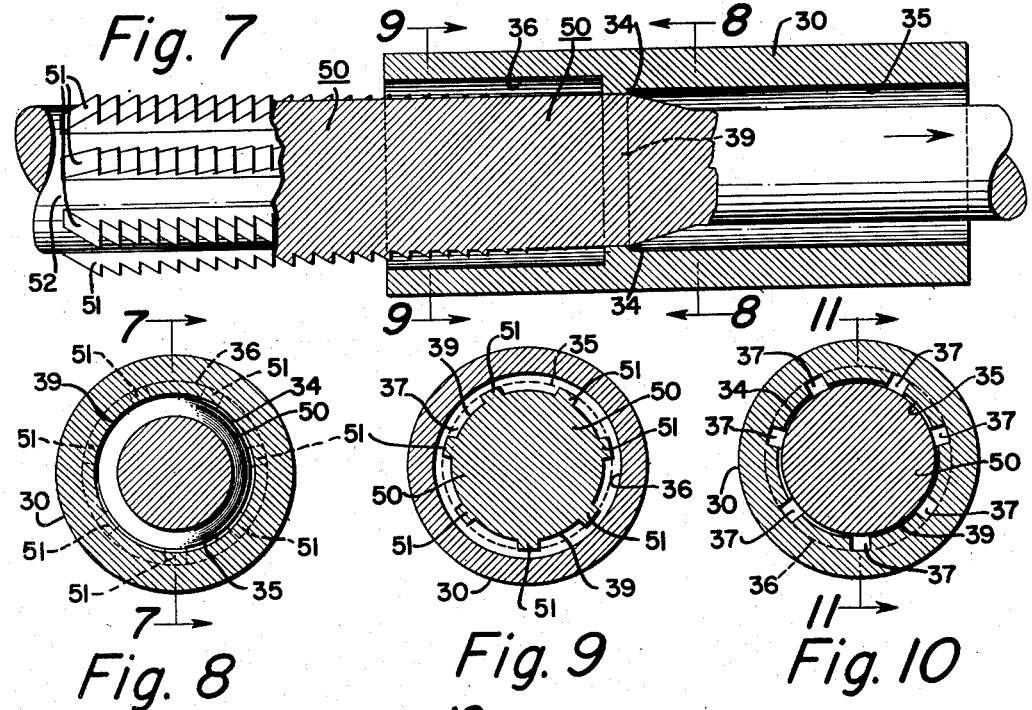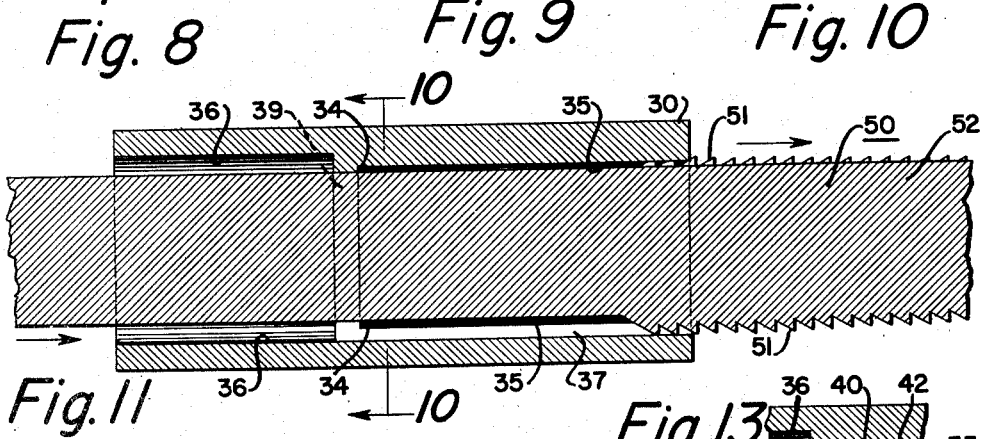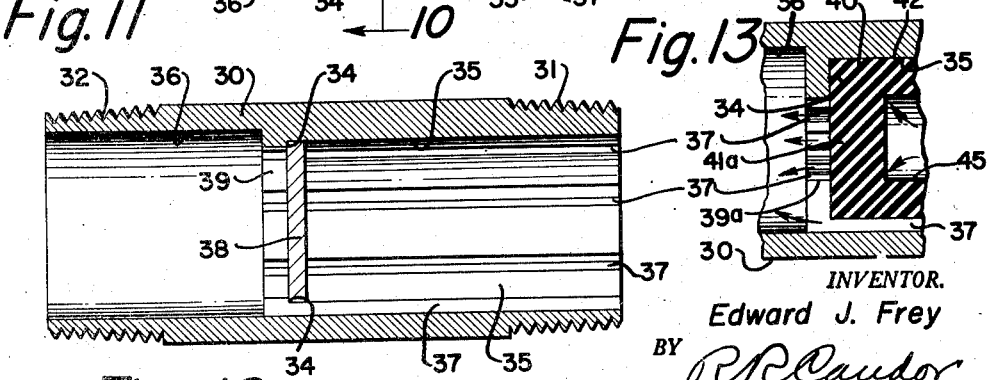

United States Patent Office 2,802,486
Patented Aug. 13, 1957

2,802,486

FLUID FLOW CONTROLLER

Edward J. Frey, Dayton, Ohio, assignor to General Motors Corporation, Detroit, Mich., a corporation of Delaware Application January 8, 1954, Serial No. 402,944

2 Claims. (Cl. 138—46)

This invention relates to domestic appliances and more particularly to a controller for fluid under varying head pressure, for example, such as measuring water for washing machines and similar appliances.

An object of this invention is to provide an improved controller having a substantially constant volume discharge under varying head pressures, or capable of reducing the variation of flow which would otherwise be produced by such variations in head pressure.

Another object of this invention is to provide an improved and simplified method of manufacturing such controller.

Further objects and advantages of the present invention will be apparent from the following description, reference being had to the accompanying drawings wherein a preferred form of the invention is clearly shown.

In the drawings:

Figure 1 is a diagrammatic representation of a washing machine provided with my improved controller.

Figure 2 is a side elevation of my controller.

Figure 3 is a transverse cross-section taken along the line 3—3 of Figure 4.

Figure 4 is a longitudinal cross-section taken along the line 4—4 of Figure 2.

Figure 5 is a partial transverse cross-section taken along the line 5—5 of Figure 4.

Figure 6 is a cross-section similar to Figure 3 and showing a slightly modified form of groove.

Figure 7 is a view, partly in cross-section and partly in elevation, showing one of the steps in the manufacture of the controller.

Figure 8 is a transverse cross-section along line 8—8 of Figure 7.

Figure 9 is a transverse cross-section along the line 9—9 of Figure 7.

Figure 10 is a transverse cross-section taken along the line 10—10 of Figure 11.

Figure 11 is a view somewhat similar to Figure 7, showing a later step in the manufacture.

Figure 12 is a view similar to Figure 11 but showing a further step.

Figure 13 is a cross-section, showing a modified form, and showing the parts modified in Figure 4.

A washing machine 20, of the automatic type now well known, is provided with water through the pipe 21. The timer 22 controls the operation of the washing machine and also of the supply of water to the washing machine, so that it is filled with water of the proper temperature and of the proper quantity when required.

For example, the timer controls the solenoids 23 and 24 which control the flow of water from the hot water supply 25 and the cold water supply 26, through a thermostatic mixing construction 27 and from there through the outlet pipe 28, through my improved controller 29 to pipe 21 and from thence to the washing machine. The timer 22 energizes the solenoids 23 and 24 and other parts of the washing machine for proper lengths of time, and the controller 29 maintains the flow of liquid therethrough at a substantially constant volume per unit of time, so that the correct amount of water is supplied to the washing machine, while the thermostat 27 maintains the water at the correct temperature. The thermostatic mixing valve indicated by numerals 23, 24 and 27 may be of any well known construction.

My controller includes a short outer rigid tubular member tube 30 having threads 31 and 32 at its ends, so that it is adapted to fit into internal threads, not shown, in pipes 28 and 21 and to produce easily made joints at these places. The fluid flows through my controller smoothly and without sharp bends. At the same time, my controller is adapted to be manufactured by a very simple process.

The controller may comprise the outer rigid tube 30 having cylindrical inner inlet wall 35 and cylindrical inner outlet wall 36 divided by a ring 39 of smaller inner diameter than the walls 35 and 36.

Longitudinally directed grooves 37 preferably are formed in the inner surface of inlet wall 35 and the ring 39. A solid stop mmeber 38 is placed against the ring 39. The stop member 38 may be in the form of a disk of sufficiently small diameter not to impede substantially the flow of fluid through the grooves 37. Preferably stop member 38 is of substantially the same diameter as the inlet wall 35. The stop member 38 abuts against the small shoulder 34 of the ring 39. The fluid can flow around the stop member 38 through the grooves 37 which surround it.

An inner flexible tube 40 is placed within the inlet wall 35. It is longitudinally fixed therein with an end 41 engaging the stop member 38 and with its outer wall 42 engaging the inlet wall 35 between the grooves 37 to provide high velocity flow of fluid through said grooves and static head pressure on the inner wall 45 within the flexible member 40, radially toward said grooves.

The static head pressure on the inner wall 45 tends to force the flexible member 40 radially into the grooves 37. The pressure of the fluid in the grooves 37 is less than the static head pressure at 45 because of the velocity head in the grooves 37. In view of this, the higher the static head pressure, the greater is the difference between the static pressure at 45 and the pressure within the grooves 37, and hence the restrictive capacity of the controller is increased with such higher static head pressure. This tends to balance the forces and tends to maintain a substantially constant volume of flow of fluid under varying head pressures through the controller or it reduces the variation of the discharge volume to a permissible amount of variation. The size of the grooves 37 and the resiliency and thickness of the flexible member 40 can be varied to produce any desired reduced variation in the fluid discharge or to produce a substantially constant discharge.

In the modification shown in Figure 13, the function of the stop member 38 is absorbed in the construction of the ring 39a in cooperation with the end wall 41a of the flexible tube, so that there is negligible distortion only in such end wall, and thus the original stop member 38 shown in Figures 4 and 12 can be omitted. The remaining parts of the modification shown in Figure 13 may be the same as described with respect to Figures 1 to 12 and hence such parts are similarly numbered.

The controller may be manufactured very simply by the method shown in Figures 7 to 12. The tube 30 is formed by boring the cylindrical inner outlet wall 36 and inner inlet wall 35 on either side of ring 39, as shown in Figure 7. Thereafter, a broaching tool 50 is run through the tube 30, preferably from left to right, as indicated in Figure 7, and this produces grooves 37 in the wall 35 and ring 39. The broaching tool 50 may be provided with toothed splines 51, producing groove cutting surfaces of gradually increasing outer diameter. The main body 52 of the broaching tool may have an outer diameter, between the splines 51, substantially equal to the inner diameter of the ring 39 to guide it through the tube 30. The largest radial extent of the splines 51 is equal to the greatest depth of the grooves, and may be equal to, or slightly smaller, than the diameter of the inner outlet wall 36.

In the operation of the device, clothes and detergent are placed in the washing machine and the timer 22 is started. The timer 22 energizes solenoids 23 and 24 together or singly for predetermined periods of time, causing hot and/or cold water to flow through controller 29 from varying head pressure supplies 25 and 26 into the washing machine. The variable head pressure of this water entering at 35 produces a varying static head pressure radially outward at 45 toward the grooves 37. The water flowing through the grooves 37 will have a less radial pressure toward 41 than the said static head pressure because of the velocity head in the grooves 37. The difference between these pressures increases and decreases as the water pressure in the supply means increases and decreases. The grooves 37 are partially filled by the flexible material of tube 40 in proportion to the supply pressure. Hence, the tube 40 tends to restrict the flow more as the supply pressure increases and less as the supply pressure decreases. This tends to produce a substantially constant discharge at the outlet 36 or tends to reduce the variation in discharge which would otherwise take place, if a non-varying passageway were provided at 37. This control is sufficient to insure the required amount of water in the washing machine 20 which is introduced during the predetermined periods of time produced by the timer 22.

While the form of embodiment of the invention as herein disclosed constitutes a preferred form, it is to be understood that other forms might be adopted as may come within the scope of the claims which follow.

What is claimed is as follows:

1. A fluid flow controller adapted to be interposed in a fluid line for maintaining a substantially constant rate of flow in said line irrespective of varying head pressure comprising, a rigid tubular member having cylindrical inner outlet and inlet walls divided by a ring of smaller inner diameter than said walls, aligned longitudinally directed straight parallel grooves in said ring and inlet wall connecting the inlet and outlet of the controller, stop means at said ring providing flow passageways through said grooves, and an elastic tube within said inlet wall having a closed end engaging said stop means and with its outer wall engaging said inlet wall between said grooves, the interior of said elastic tube communicating with said inlet whereby static inlet pressure in said tube forces portions of said tube member into said grooves to radially constrict said grooves.

2. A fluid flow controller adapted to be interposed in a fluid line for maintaining a substantially constant rate of flow in said line irrespective of varying head pressure comprising, a rigid tubular member having cylindrical inner outlet and inlet walls, a cup-shaped elastic tubular member within said rigid tubular member with the bottom of the cup forming the downstream end of said elastic tubular member and with its mouth forming the upstream end of said elastic tubular member and being open to fluid entering said rigid tubular member, stop means holding said elastic tubular member against longitudinal movement within said rigid tubular member, the outer wall of said elastic tubular member engaging the inner inlet wall of said rigid tubular member and said inner inlet wall of said rigid tubular member having longitudinally directed straight parallel grooves, whereby fluid entering said cup-shaped elastic tubular member forces the outer wall of said elastic tubular member into said grooves to radially constrict the same.

References Cited in the file of this patent

UNITED STATES PATENTS

| | | |
|---|---|---|
| 1,879,197 | Greenwald | Sept. 27, 1932 |
| 2,113,615 | Farmer | Apr. 12, 1938 |
| 2,506,152 | Hunter | May 2, 1950 |